United States Patent
Watanabe et al.

(10) Patent No.: US 9,933,692 B2
(45) Date of Patent: Apr. 3, 2018

(54) HEAD-UP DISPLAY DEVICE

(71) Applicant: AISIN AW CO., LTD, Anjo-shi, Aichi-ken (JP)

(72) Inventors: Kenji Watanabe, Okazaki (JP); Hiroyuki Miyake, Toyota (JP); Naoya Oyuki, Matsumoto (JP); Shintaro Hirohara, Matsumoto (JP)

(73) Assignee: AISIN AW CO., LTD., Anjo (JP)

( * ) Notice: Subject to any disclaimer, the term of this patent is extended or adjusted under 35 U.S.C. 154(b) by 95 days.

(21) Appl. No.: 14/908,776

(22) PCT Filed: Jul. 4, 2014

(86) PCT No.: PCT/JP2014/067920
§ 371 (c)(1),
(2) Date: Jan. 29, 2016

(87) PCT Pub. No.: WO2015/029598
PCT Pub. Date: Mar. 5, 2015

(65) Prior Publication Data
US 2016/0161833 A1    Jun. 9, 2016

(30) Foreign Application Priority Data

Aug. 29, 2013 (JP) ................................ 2013-177587

(51) Int. Cl.
*G02B 27/01* (2006.01)
*G03B 21/14* (2006.01)
(Continued)

(52) U.S. Cl.
CPC ............ *G03B 21/142* (2013.01); *B60K 35/00* (2013.01); *B60R 1/00* (2013.01); *G02B 27/01* (2013.01);
(Continued)

(58) Field of Classification Search
None
See application file for complete search history.

(56) References Cited

U.S. PATENT DOCUMENTS

| 5,510,983 A | 4/1996 | Iino |
| 5,645,334 A | 7/1997 | Tejima et al. |

(Continued)

FOREIGN PATENT DOCUMENTS

| DE | 43 38 579 A1 | 7/1994 |
| GB | 2 269 681 A | 2/1994 |

(Continued)

OTHER PUBLICATIONS

August 5, 2014 Search Report issued in International Application No. PCT/JP2014/067920.

(Continued)

*Primary Examiner* — Amare Mengistu
*Assistant Examiner* — Shawna Stepp Jones
(74) *Attorney, Agent, or Firm* — Oliff PLC

(57) ABSTRACT

A head-up display device includes a screen, a projector that projects a visual image to the screen using a projection lens, and a processor. The processor is programmed to generate a virtual image of the visual image from the projected visual image and determine an image-generation position at which the virtual image is to be generated. The screen and the projection lens are configured to be movable along an optical path of the projector. The processor is programmed to determine a screen position to which the screen is to be moved based on the decided image-generation position and determine a lens position to which the projection lens is to be moved based on the determined screen position. The projector includes a screen-drive motor that moves the (Continued)

screen to the determined screen position and a lens-drive motor that moves the projection lens to the determined lens position.

5 Claims, 15 Drawing Sheets

(51) Int. Cl.
 *B60K 35/00* (2006.01)
 *B60R 1/00* (2006.01)
 *G03B 21/53* (2006.01)
(52) U.S. Cl.
 CPC ..... *G02B 27/0101* (2013.01); *G02B 27/0149* (2013.01); *G02B 27/0179* (2013.01); *G03B 21/53* (2013.01); *B60R 2300/205* (2013.01); *G02B 2027/014* (2013.01); *G02B 2027/0127* (2013.01); *G02B 2027/0154* (2013.01); *G02B 2027/0185* (2013.01)

(56) References Cited

U.S. PATENT DOCUMENTS

| | | | | |
|---|---|---|---|---|
| 2006/0285089 | A1* | 12/2006 | Higashi | G03B 21/53 353/101 |
| 2009/0160736 | A1* | 6/2009 | Shikita | G02B 27/0101 345/7 |
| 2011/0235185 | A1* | 9/2011 | Kanamori | G02B 27/01 359/630 |
| 2012/0154768 | A1* | 6/2012 | Tatsuno | G03B 21/147 353/98 |
| 2012/0162753 | A1* | 6/2012 | Tatsuno | G02B 17/08 359/364 |
| 2013/0188259 | A1 | 7/2013 | Nakamura et al. | |

FOREIGN PATENT DOCUMENTS

| | | |
|---|---|---|
| JP | S61-133425 U | 8/1986 |
| JP | S63-139032 U | 9/1988 |
| JP | H06-115381 A | 4/1994 |
| JP | H08-106065 A | 4/1996 |
| JP | 2001-249401 A | 9/2001 |
| JP | 2002-052953 A | 2/2002 |
| JP | 2004-126226 A | 4/2004 |
| JP | 2005-292428 A | 10/2005 |
| JP | 2007094394 A | 4/2007 |
| JP | 2009-150947 A | 7/2009 |
| JP | 2009288388 A | 12/2009 |
| JP | 2010145924 A | 7/2010 |
| JP | 2011-133508 A | 7/2011 |
| JP | 2012 163613 A | 8/2012 |
| JP | 2013-127489 A | 6/2013 |
| WO | 2007/049664 A1 | 5/2007 |
| WO | 2012/036098 A1 | 3/2012 |

OTHER PUBLICATIONS

Jul. 29, 2016 Search Report issued in European Patent Application No. 14840255.5.
Jun. 17, 2014 Search Report issued in International Patent Application No. PCT/JP2014/059141.
Dec. 16, 2016 Office Action Issued in U.S. Appl. No. 14/895,857.
U.S. Appl. No. 14/895,857, filed Dec. 3, 2015 in the name of Watanabe et al.
Aug. 5, 2014 Search Report issued in International Patent Application No. PCT/JP2014/067920.
Mar. 14, 2017 Search Report issued in European Patent Application No. EP 14818350.2.
Jun. 28, 2017 Office Action issued in U.S. Appl. No. 14/895,857.

\* cited by examiner

FIG. 10
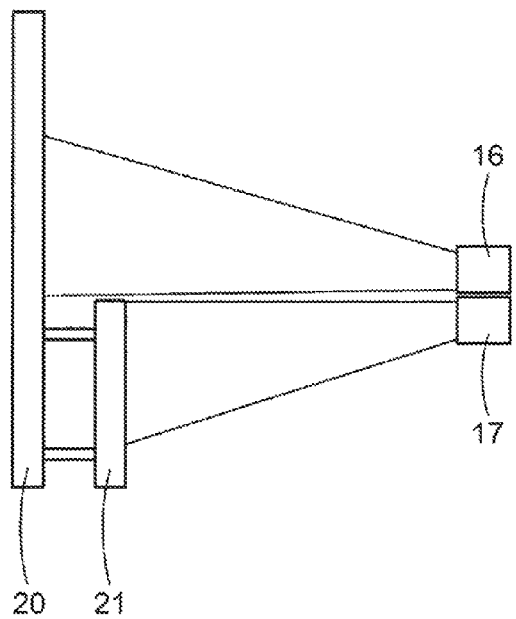
FIRST PROJECTION MODE
SCREENS ARE MOVED UPWARD TOGETHER    SCREENS ARE MOVED DOWNWARD TOGETHER
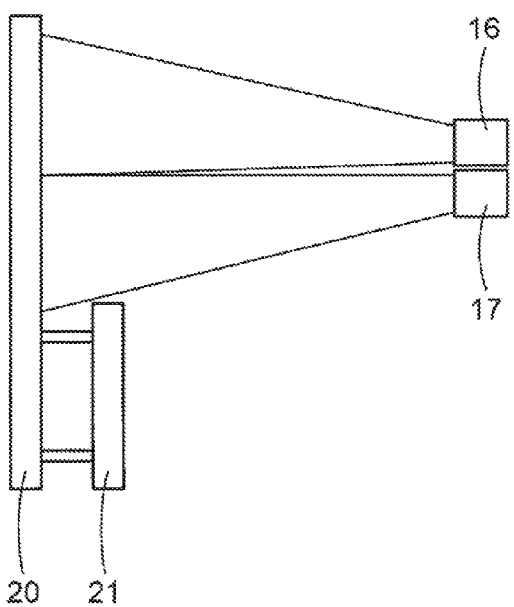
SECOND PROJECTION MODE

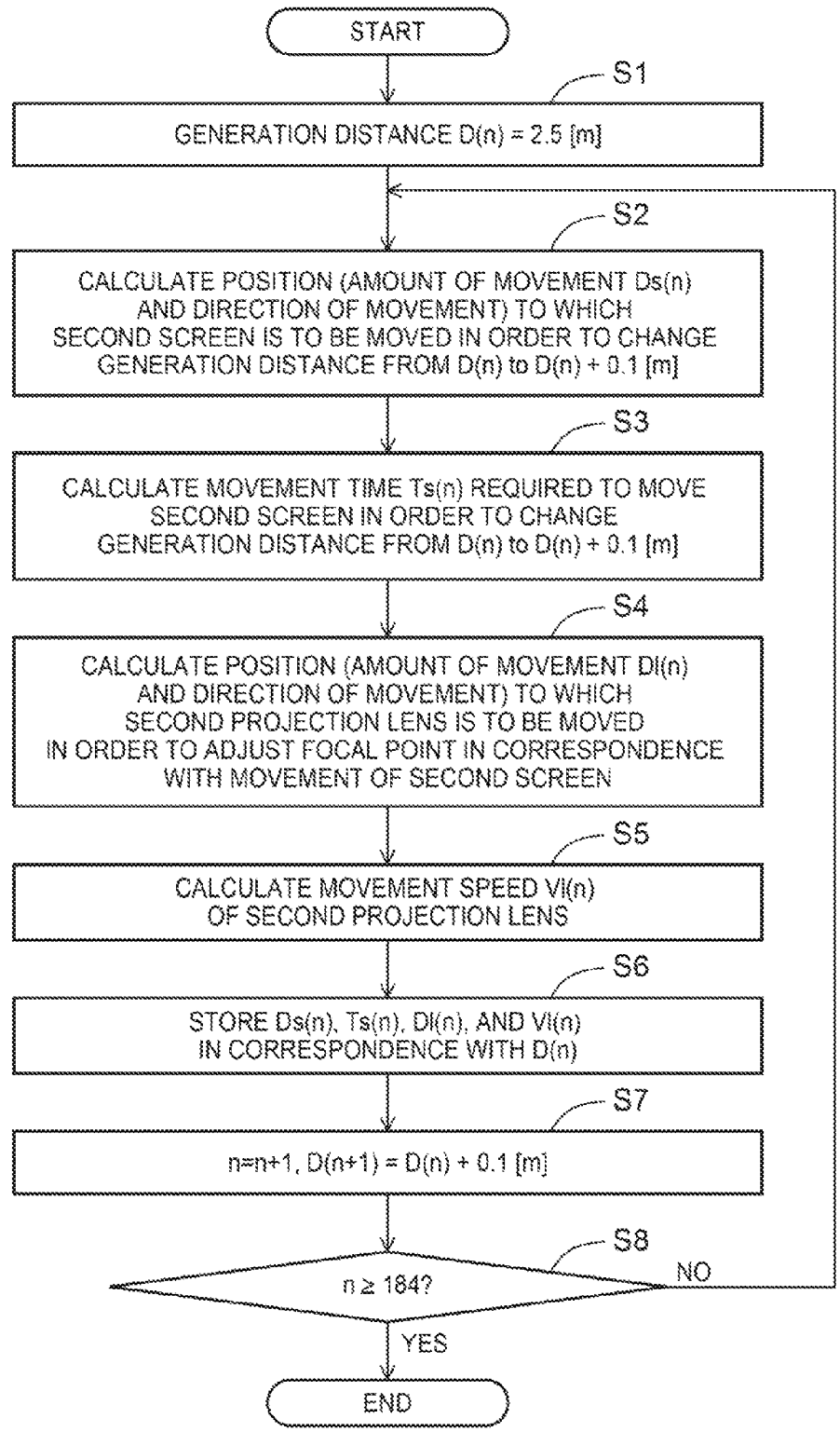

FIG. 13

POSITION SETTING TABLE

| GENERATION DISTANCE L2(m) | AMOUNT OF MOVEMENT OF SECOND SCREEN [m] | MOVEMENT TIME OF SECOND SCREEN [s] | AMOUNT OF MOVEMENT OF SECOND PROJECTION LENS [m] | MOVEMENT SPEED OF SECOND PROJECTION LENS [m/s] |
|---|---|---|---|---|
| 2.5 ⇔ 2.6 | A1 | B1 | C1 | D1 |
| 2.6 ⇔ 2.7 | A2 | B2 | C2 | D2 |
| ... | ... | ... | ... | ... |
| 19.9 ⇔ 20.0 | A176 | B176 | C176 | D176 |

- DIRECTION OF MOVEMENT OF SECOND SCREEN IS OPPOSITE TO DIRECTION OF MOVEMENT OF SECOND PROJECTION LENS.
- DIRECTIONS OF MOVEMENT OF SECOND SCREEN AND SECOND PROJECTION LENS FOR INCREASING GENERATION DISTANCE ARE OPPOSITE TO DIRECTIONS OF MOVEMENT OF SECOND SCREEN AND SECOND PROJECTION LENS FOR REDUCING GENERATION DISTANCE

FIG. 15
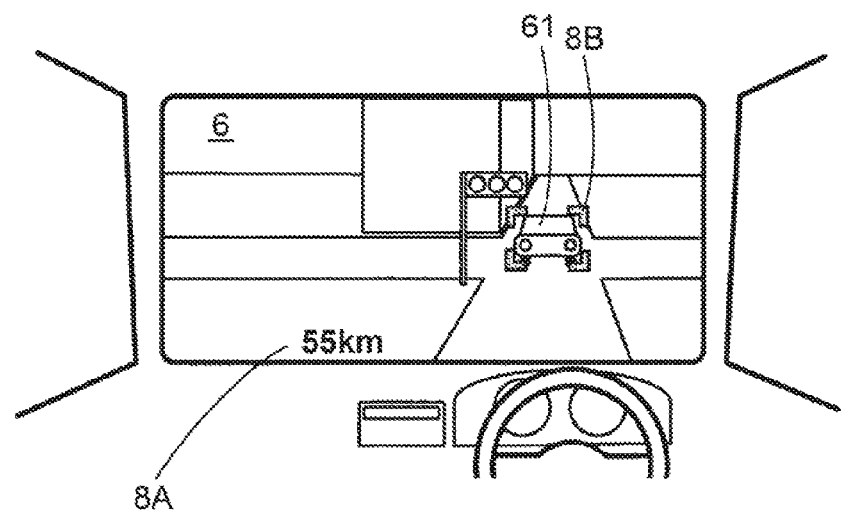
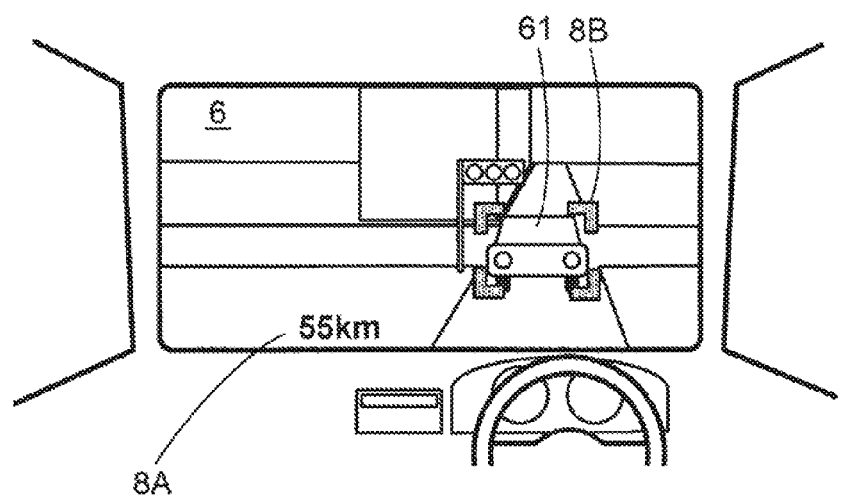

FIG. 18
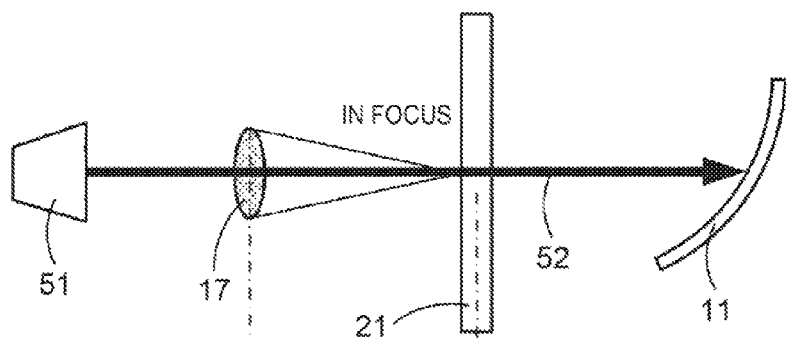
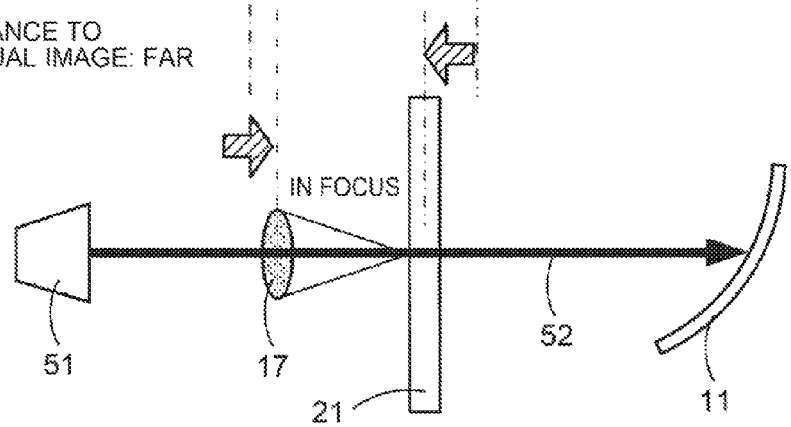

FIG. 19
DISTANCE TO VIRTUAL IMAGE: CLOSE
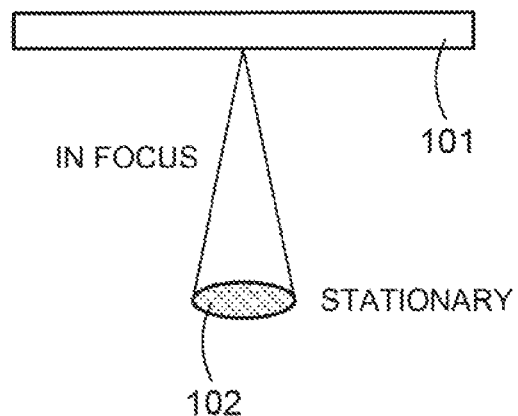
DISTANCE TO VIRTUAL IMAGE: FAR
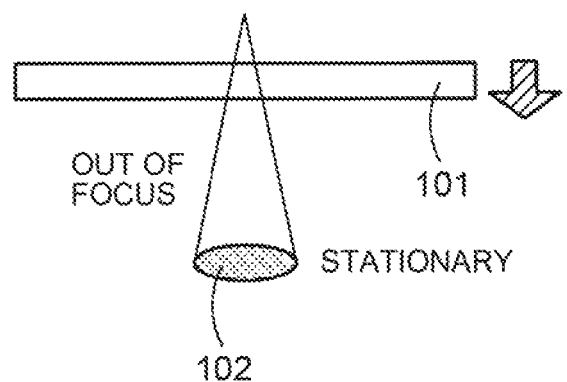

HEAD-UP DISPLAY DEVICE

TECHNICAL FIELD

Related technical fields include head-up display devices that are mountable on a mobile body and that generate various visual images to be visually recognized by a passenger of the mobile body.

BACKGROUND

Hitherto, various means have been used as information providing means for providing a passenger of a mobile body such as a vehicle with route guidance and drive information such as a warning of an obstacle. Examples of such means include display on a liquid crystal display installed in the mobile body and audio output from a speaker. In recent years, a head-up display device (hereinafter referred to as an "HUD") has been provided as an example of the information providing means.

As described in Japanese Patent Application Publication No. 2009-288388 (JP 2009-288388 A), an HUD installed in a vehicle, in particular, as an example of a mobile body can generate a virtual image as superimposed on the foreground in the forward field of view ahead of a window (e.g. the windshield) of the vehicle as seen from a passenger of the vehicle. As a result, it is possible to reduce movement of the line of vision as much as possible when the passenger visually recognizes the drive information, and to reduce a burden during drive.

SUMMARY

In order to reduce a burden during drive on the passenger of the vehicle, it is important to appropriately set the position at which a virtual image is generated (more specifically, the distance from the passenger to the virtual image). In order to generate a virtual image for warning of an obstacle, for example, it is desirable to generate the virtual image at the position at which the obstacle is actually present. In the case where a virtual image for providing guidance on a right or left turn to be made on a road is to be generated, meanwhile, it is desirable to generate the virtual image at the location of the right or left turn.

JP 2009-288388 A discloses a device in which a liquid crystal display panel that displays a visual image to be generated as a virtual image is configured to be movable in position forward and rearward along an optical path to adjust the position at which the virtual image is generated.

While JP 2009-288388 A describes an HUD that uses a liquid crystal display panel as display means for displaying a visual image to be generated as a virtual image, another example of such display means may be composed of a projector that projects a visual image and a screen that displays the visual image projected from the projector. In the HUD thus configured, in order to display a clear visual image on the screen, it is necessary to accurately adjust the focal point of the lens of the projector to the position of the screen.

However, if a screen 101 is moved toward a projection lens 102 in order to increase the distance from the passenger to the virtual image as illustrated in FIG. 19, for example, the focal point of the projection lens 102 which has been stationary in position is not on the screen 101 after being moved, because the focal point of the projection lens 102 has been adjusted to the position of the screen 101 before being moved. As a result, a clear visual image cannot be displayed on the screen 101.

Exemplary embodiments of the broad inventive principles described herein provide a head-up display device that can generate a high-quality visual image as a virtual image.

In order to achieve the foregoing object, exemplary embodiments provide a head-up display device that generates a virtual image that is visually recognizable by a user, including: a screen; a projector that projects a visual image to the screen using a projection lens; and virtual image veneration means for generating a virtual image of the visual image from the visual image projected to the screen. The screen and the projection lens are configured to be movable along an optical path of the projector. The head-up display device further includes the following means. Specifically, the head-up display device further includes: virtual image position decision means for deciding a position at which the virtual image is to be generated; screen position decision means for deciding a screen position, to which the screen is to be moved, on the basis of the position decided by the virtual image position decision means; screen movement means for moving the screen to the screen position decided by the screen position decision means; lens position decision means for deciding a lens position, to which the projection lens is to be moved, on the basis of the screen position decided by the screen position decision means; and lens movement means for moving the projection lens to the lens position decided by the lens position decision means.

With the head-up display device configured as described above, the projection lens and the screen are respectively moved along the optical path. Thus, the distance from the user to the virtual image can be adjusted by moving the screen, and the focal point of the visual image projected from the projection lens can be adjusted on the screen even in the case where the screen is moved. Thus, a high-quality visual image can be generated as the virtual image. In addition, the position at which the virtual image is to be generated is decided, and thereafter the position of the screen is decided on the basis of the decided position of the virtual image. Thus, in the case where a visual image for an object such as an obstacle and an intersection, the distance to which from the user is variable, is displayed as a virtual image, the virtual image can be generated at an appropriate position that matches the distance from the user to the object. Further, the position of the projection lens is decided on the basis of the decided position of the screen. Thus, the focal point of the visual image projected from the projection lens can be adjusted on the screen while generating a virtual image at an appropriate position that matches the distance from the user to the object.

BRIEF DESCRIPTION OF THE DRAWINGS

FIG. 10 illustrates modes of projection of the visual image from the projector for a case where the first screen and the second screen are moved in the up-down direction.

FIG. 12 is a flowchart of a table generation processing program according to the embodiment.

FIG. 13 illustrates an example of a position setting table.

FIG. 15 illustrates an example of a virtual image that is visually recognizable from a passenger of a vehicle.

FIG. 18 illustrates the positional relationship between the second screen and the second projection lens for a case where the second screen is moved.

FIG. 19 illustrates an issue of the related art.

DETAILED DESCRIPTION OF EXEMPLARY EMBODIMENTS

A head-up display device according to a specific embodiment will be described in detail below with reference to the drawings.

Figure 1:
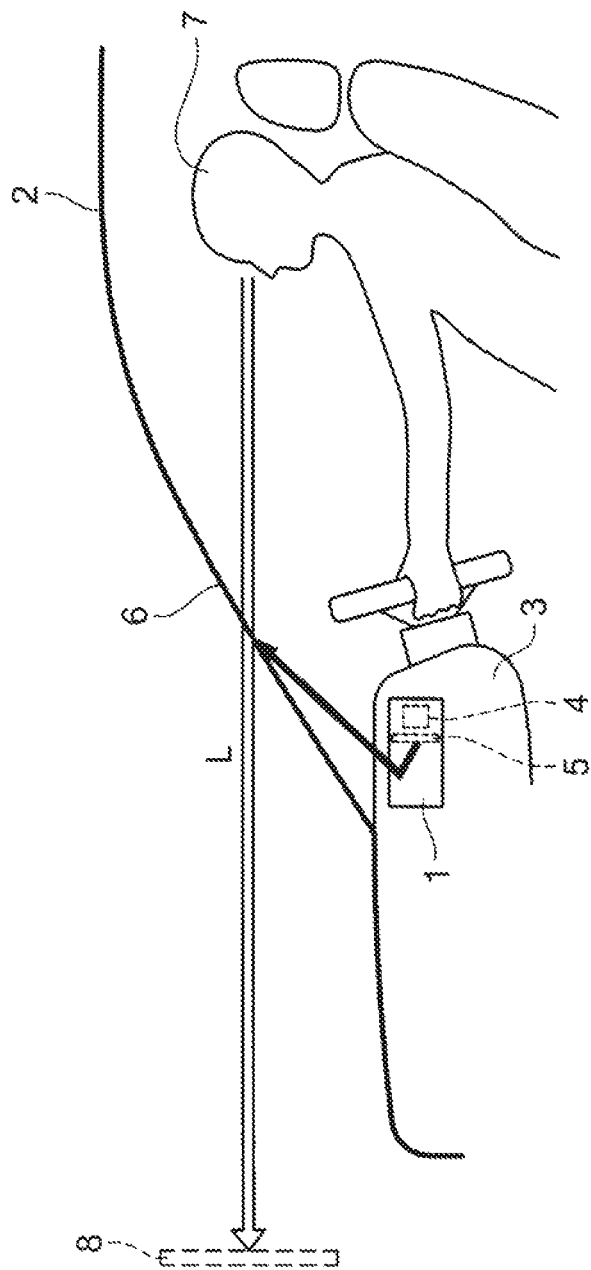
FIG. 1 illustrates a mode of installation of an HUD according to an embodiment in a vehicle.

First, the configuration of a head-up display device (hereinafter referred to as an "HUD") 1 according to the embodiment will be described with reference to FIG. 1. FIG. 1 illustrates a mode of installation of the HUD 1 according to the embodiment in a vehicle 2.

As illustrated in FIG. 1, the HUD 1 is installed inside a dashboard 3 of the vehicle 2, and internally includes a projector 4 and a screen 5 to which a visual image from the projector 4 is projected. The visual image projected to the screen 5 is reflected to a windshield 6 ahead of a driver's seat via a mirror and a Fresnel lens provided in the HUD 1 as discussed later to be visually recognized by a passenger 7 of the vehicle 2. Examples of the visual image projected to the screen 5 include information on the vehicle 2 and various kinds of information used to assist the passenger 7 in driving. Examples of such information include a warning of an obstacle (another vehicle or a pedestrian), a route for guidance set by a navigation device and guidance information (such as an arrow that indicates the direction of a right or left turn) based on the route for guidance, the current vehicle speed, a guide sign, a map image, traffic information, news, a weather forecast, the time the screen of a connected smartphone, and a television program.

The HUD 1 according to the embodiment is configured such that in the case where the passenger 7 visually recognizes the visual image projected to the screen 5 and reflected to the windshield 6, the passenger 7 visually recognizes the visual image projected to the screen 5 as a virtual image 8 at a position far ahead of the windshield 6, rather than at the position of the windshield 6. The virtual image 8 that is visually recognizable by the passenger 7 is a visual image projected to the screen 5 via a mirror, and thus has been inverted in the up-down direction, in addition, the virtual image 8 has been changed in size via a Fresnel lens.

The position at which the virtual image 8 is generated, more specifically a distance (hereinafter referred to as a "generation distance") L from the passenger 7 to the virtual image 8, can be set as appropriate in accordance with the shape and the position of the mirror and the Fresnel lens provided in the HUD 1, the position of the screen 5 with respect to an optical path, and so forth. In the embodiment, in particular, the screen 5 is configured to be movable in position in the front-rear direction along the optical path as discussed later. As a result, the generation distance L can be changed as appropriate. For example, the generation distance L can be changed between 2.5 m to 20 m.

Figure 2:
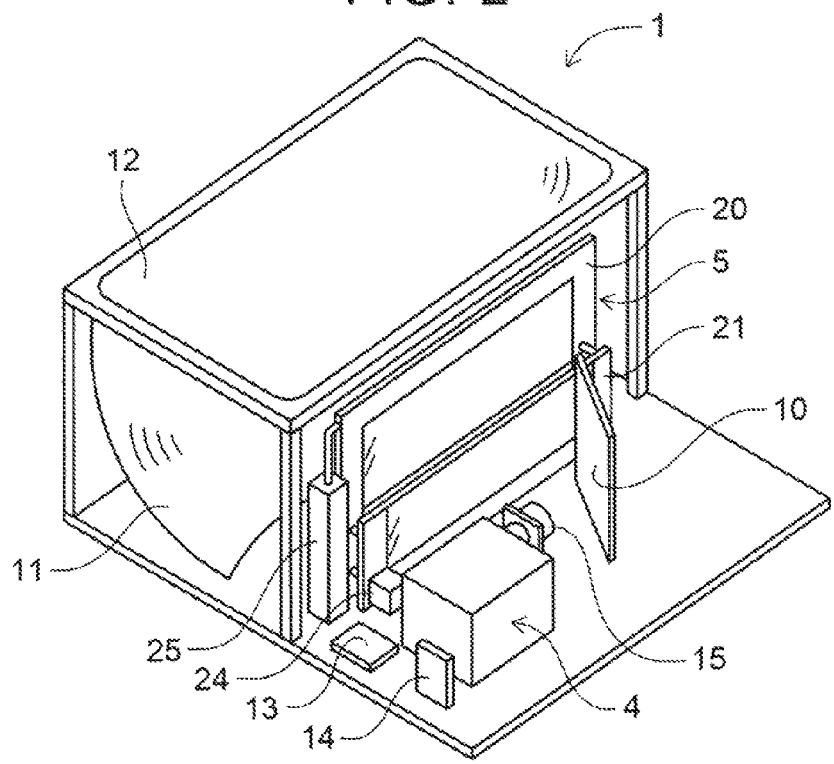
FIG. 2 illustrates the internal configuration of the HUD according to the embodiment.

Next, a more specific configuration of the HUD 1 will be described with reference to FIG. 2. FIG. 2 illustrates the internal configuration of the HUD 1 according to the embodiment.

As illustrated in FIG. 2, the HUD 1 is basically composed of the projector 4, the screen 5, a reflective mirror 10, a mirror 11, a Fresnel lens 12, a control circuit section 13, and a CAN interface 14.

Figure 3:
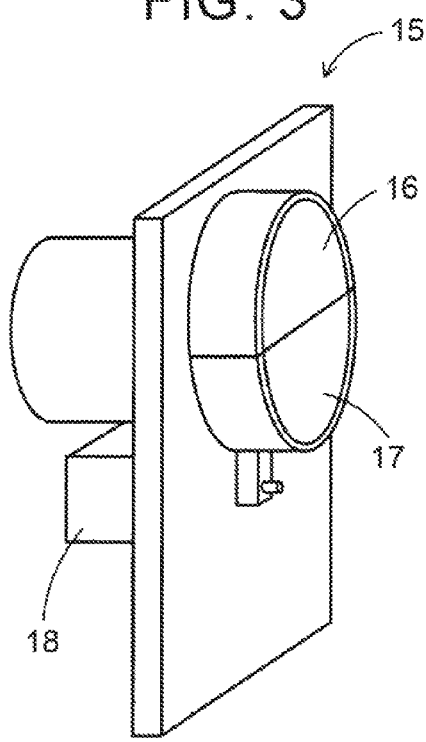
FIG. 3 illustrates a first projection lens and a second projection lens provided in a projector.

The projector 4 is a visual image projection device that uses an LED light source as a light source, and may be a DLP projector, for example. A liquid crystal projector or an LCOS projector may also be used as the projector 4. The projector 4 includes a projection lens 15 that projects a visual image. In the embodiment, the projection lens 15 is composed of two projection lenses, namely a first projection lens 16 and a second projection lens 17, which can respectively project different visual images. FIG. 3 illustrates the first projection lens 16 and the second projection lens 17 provided in the projector 4.

Figure 4:
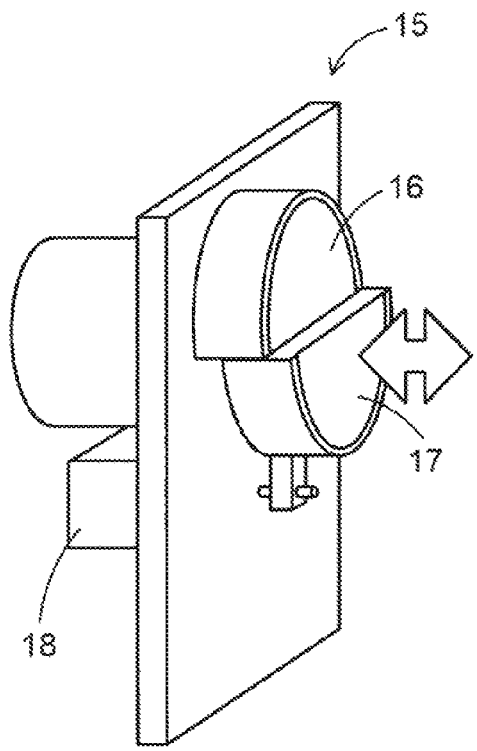
FIG. 4 illustrates a mode of movement of the second projection lens.

As illustrated in FIG. 3, the first projection lens 16 and the second projection lens 17 are shaped by dividing a single circular lens in the up-down direction. Further, the second projection lens 17 which is provided on the lower side is configured to be movable in the front-rear direction along the optical path. On the other hand, the first projection lens 16 is stationary in position. Specifically, the second projection lens 17 can be moved in the front-rear direction along the optical path as illustrated in FIG. 4 by driving a lens drive motor 1 provided on the back surface side of the second projection lens 17. In the embodiment, in particular, in the case where the screen 5 is moved in the front-rear direction along the optical path as discussed later, the second projection lens 17 is also moved accordingly in order that the focal point of the visual image projected from the second projection lens 17 coincides with the position of the screen 5 after being moved.

The lens drive motor 18 is constituted of a stepping motor. The HUD 1 can appropriately position the second projection lens 17 at a set position by controlling the lens drive motor 18 on the basis of a pulse signal transmitted from the control circuit section 13.

Figure 5:
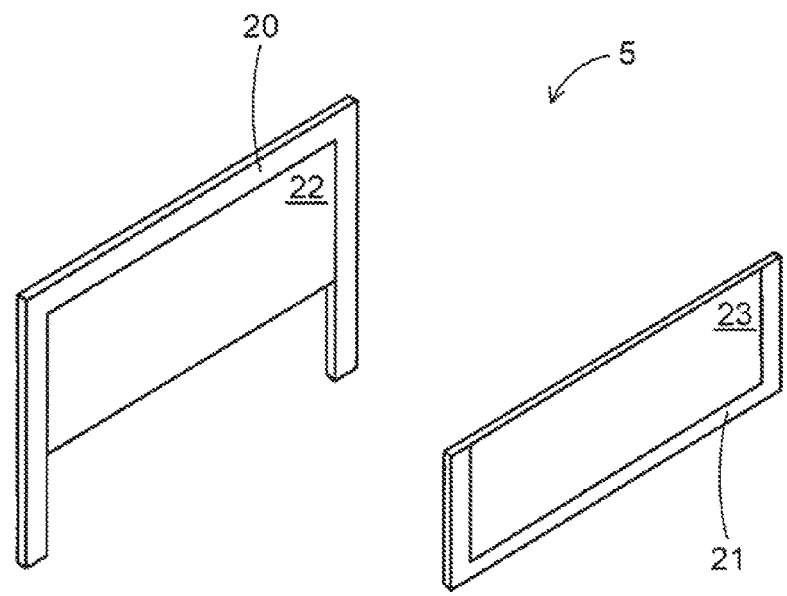
FIG. 5 illustrates a first screen and a second screen.

The screen 5 is a projection medium to which a visual image is projected from the projector 4. For example, a Fresnel screen, a diffusion screen, or the like may be used as the screen 5. In the embodiment, the screen 5 is composed of two screens, namely a first screen 20 and a second screen 21. FIG. 5 illustrates the first screen 20 and the second screen 21.

Figure 6:
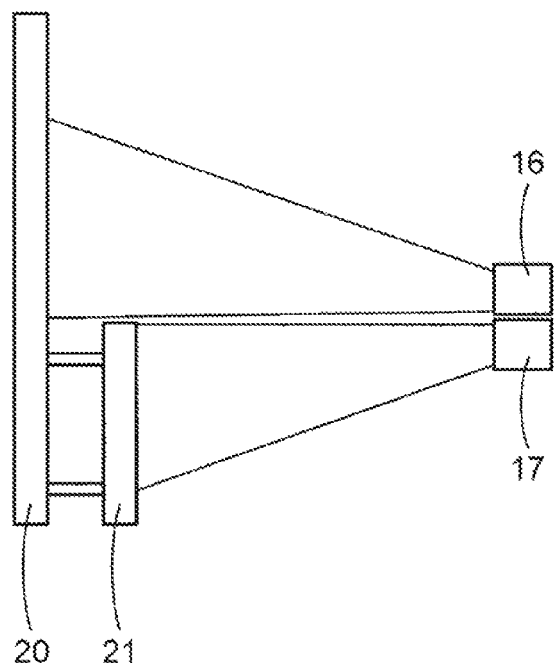
FIG. 6 illustrates a mode of projection of visual images from a projector to the first screen and the second screen.

As illustrated in FIG. 5, the first screen 20 has a projection area 22 which is provided on the upper side and to which a visual image is projected. As illustrated in FIG. 6, a visual image projected from the first projection lens 16 of the projector 4 is displayed on the first screen 20. Meanwhile, the second screen 21 has a projection area 23 which is provided on the lower side and to which a visual image is projected. As illustrated in FIG. 6, a visual image projected from the second projection lens 17 of the projector 4 is displayed on the second screen 21. As illustrated in FIGS. 2 and 6, the first screen 20 and the second screen 21 are disposed with a predetermined clearance in the front-rear direction along the optical path such that the projection areas 22 and 23 do not overlap each other. Thus, in the embodiment, the virtual image 8 is composed of a virtual image (hereinafter referred to as a "first virtual image 8A") of the visual image projected to the first screen 20 and a virtual image (hereinafter referred to as a "second virtual image 8B") of the visual image projected to the second screen 21.

Figure 7:
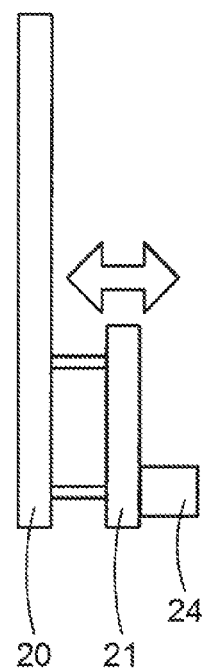
FIG. 7 illustrates a mode of movement of the second screen in the front-rear direction with respect to an optical path.

The second screen 21 is configured to be movable in the front-rear direction along the optical path. On the other hand, the first screen 20 is stationary in position in the front-rear direction. Specifically, the second screen 21 can be moved in the front-rear direction along the optical path by changing the distance between the first screen 20 and the second screen 21 as illustrated in FIG. 7 by driving a screen front-rear drive motor 24 provided on the back surface side of the second screen 21. As a result, the position (specifically, a generation distance L2 which is the distance from the passenger 7 to the second virtual image 8B) at which the second virtual image 8B which is a virtual image of the visual image projected to the second screen 21 is to be generated can be changed. The generation distance L2 depends on the distance from the mirror 11 to the second screen 21. That is, the generation distance L2 is changed to be longer or shorter in accordance with the distance from the mirror 11 to the second screen 21. For example, the generation distance L2 becomes longer as the distance from the mirror 11 to the second screen 21 becomes longer, and the generation distance L2 becomes shorter as the distance from the mirror 11 to the second screen 21 becomes shorter.

For example, when the second screen 21 is moved toward the projector 4 (toward the side on which the distance to the mirror 11 becomes longer), the generation distance L2 becomes longer (that is, the second virtual image 8B is visually recognized at a location farther from the passenger 7). When the second screen 21 is moved toward the side opposite to the projector 4 (toward the side on which the distance to the mirror 11 becomes shorter), on the other hand, the generation distance L2 becomes shorter (that is, the second virtual image 8B is visually recognized at a location closer to the passenger 7). Since the lint screen 20 is stationary in position in the front-rear direction, the position (specifically, a generation distance L1 which is the distance from the passenger 7 to the first virtual image 8A) at which the first virtual image 8A which is a virtual image of the visual image projected to the first screen 20 is to be generated is stationary. Thus, the distance (|L2−L1|) from the first virtual image 8A to the second virtual image 8B is changed by changing the generation distance L2.

Figure 8:
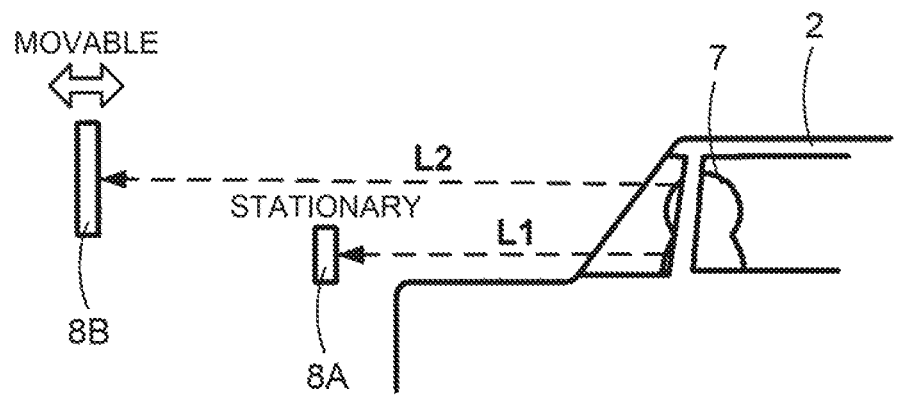
FIG. 8 illustrates virtual images generated by visual images projected to the first screen and the second screen.

Thus, in the case where the first screen 20 and the second screen 21 are at the same distance from the mirror 11 along the optical path, the first virtual image 8A and the second virtual image 8B are generated at the same position ahead of the vehicle 2. In the case where the first screen 20 and the second screen 21 are at different distances from the mirror 11 along the optical path, however, the first virtual image 8A and the second virtual image 8B are generated at different positions as illustrated in FIG. 8. As illustrated in FIGS. 5 and 6, the screens are disposed such that the projection area 22 of the first screen 20 is positioned above the projection area 23 of the second screen 21. Since the visual image is inverted upside down by the mirror 11, however, the second virtual image 8B is generated above the first virtual image 8A with respect to a direction that intersects the optical path.

Figure 9:
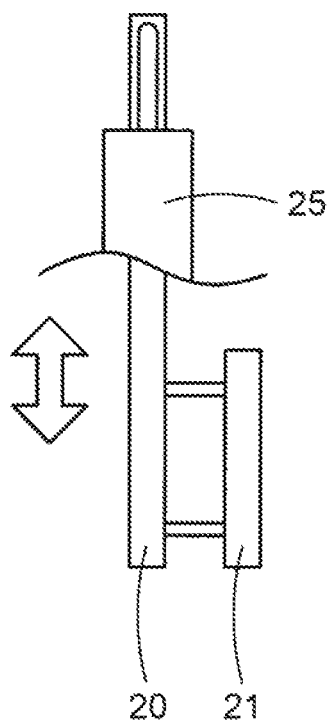
FIG. 9 illustrates a mode of movement of the first screen and the second screen in a direction that intersects the optical path.

In the embodiment, the first screen 20 and the second screen 21 are configured to be movable together in a direction that intersects the optical path. Specifically, the first screen 20 and the second screen 21 can be moved together in a direction that intersects the optical path as illustrated in FIG. 9 by driving a screen up-down drive motor 25 provided on a side surface of the first screen 20. As a result, as illustrated in FIG. 10, the mode of projection of an image to the screen 5 can be switched between a first projection mode in which the visual image from the projector 4 is projected to the first screen 20 and the second screen 21 and a second projection mode in which the visual image from the projector 4 is projected to only the first screen 20.

In the case where the mode of projection is the first projection mode, the HUD 1 basically projects different types of visual images from the first projection lens 16 and the second projection lens 17 (for example, a visual image for the current vehicle speed of the vehicle from the first projection lens 16 and a visual image for guidance information or warning information from the second projection lens 17) to the respective screens. In the case where the mode of projection is the second projection mode, on the other hand, the HUD 1 basically projects a single visual image obtained by combining visual images projected from the first projection lens 16 and the second projection lens 17 (for example, a visual image for the lower half of a television screen from the first projection lens 16 and a visual image for the upper half of the television screen from the second projection lens 17) to the first screen 20. Consequently, a visual image of a larger size with no dividing line can be generated as a virtual image in the second projection mode. Different types of visual images can be projected from the first projection lens 16 and the second projection lens 17 also in the second projection mode.

The screen front-rear drive motor 24 and the screen up-down drive motor 25 are each constituted of a stepping motor. The HUD 1 can appropriately position the second screen 21 at a set position in the front-rear direction by controlling the screen front-rear drive motor 24 on the basis of a pulse signal transmitted from the control circuit section 13. In addition, the HUD 1 can appropriately position the first screen 20 and the second screen 21 at a set position in the up-down direction by controlling the screen up-down drive motor 25 on the basis of a pulse signal transmitted from the control circuit section 13.

The reflective mirror 10 is a reflective plate that changes the optical path by reflecting a visual image projected from the projector 4 as illustrated in FIG. 2 to project the visual image to the screen 5.

The mirror 11 is projection means for reflecting visual image light from the screen 5 as illustrated in FIG. 2 to project the virtual image 8 (see FIG. 1) ahead of the passenger 7 via the windshield 6. A spherical concave mirror, an aspherical concave mirror, or a freely curved mirror for correcting distortion of the projected visual image may be used as the mirror 11.

The Fresnel lens 12 is a magnifying glass that magnifies the visual image projected to the screen 5 to generate the virtual image S as illustrated in FIG. 2. In the HUD 1 according to the embodiment, the visual image projected to the screen 5 is reflected to the windshield 6 via the mirror 11 and the Fresnel lens 12 to be visually recognized by the passenger 7. Thus, the visual image projected to the screen 5 is magnified at a position far ahead of the windshield 6 to be visually recognized by the passenger as the virtual image 8 (see FIG. 1).

Figure 11:
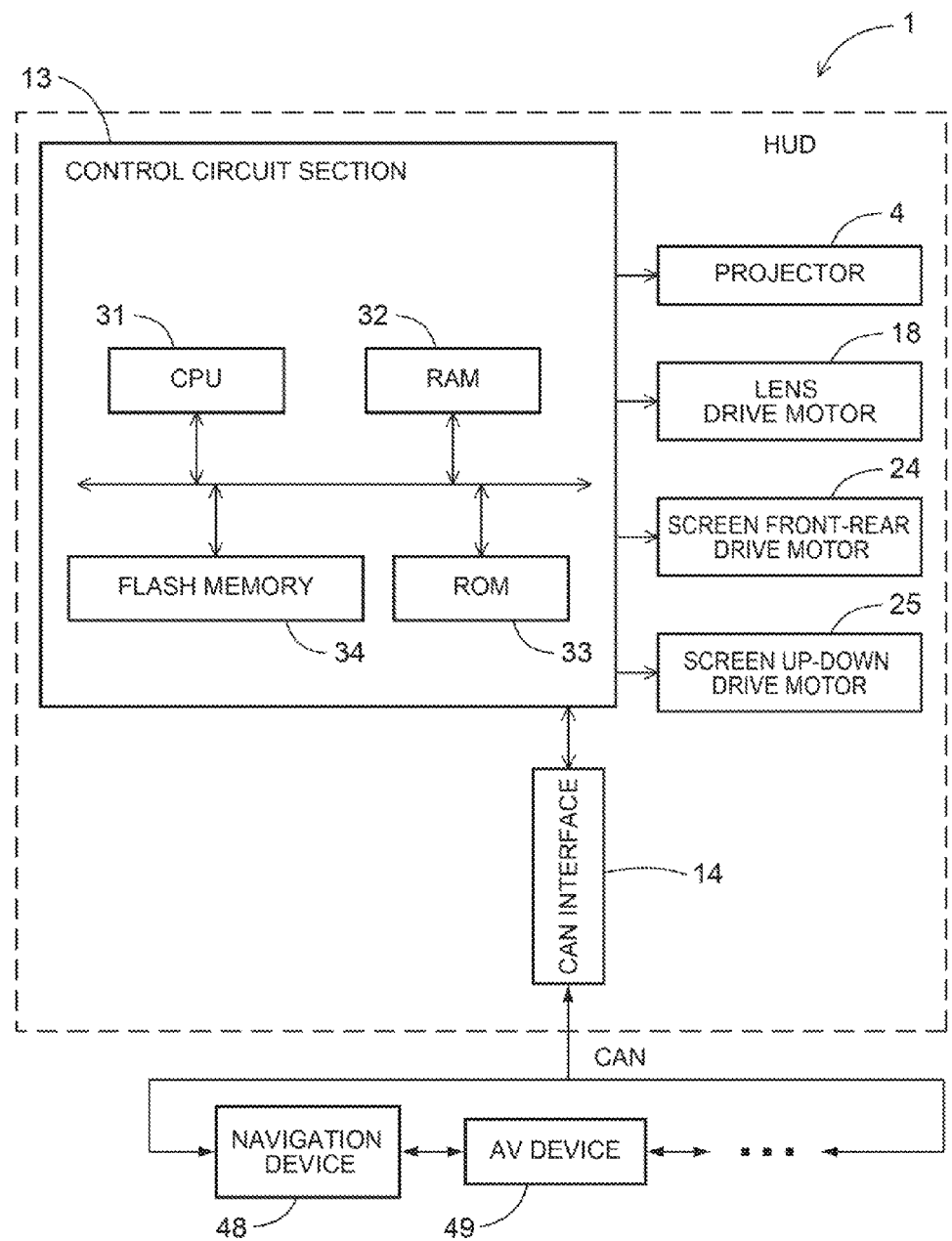
FIG. 11 is a block diagram illustrating the configuration of the HUD according to the embodiment.

The control circuit section 13 is an electronic control unit that controls the entire HUD 1. FIG. 11 is a block diagram illustrating the configuration of the HUD 1 according to the embodiment.

As illustrated in FIG. 11, the control circuit section 13 includes a CPU 31 that serves as a computation device and a control device, and internal storage devices such as a RAM 32 that is used as a working memory when the CPU 31 performs various computation processes, a ROM 33 that stores a control program, a table generation processing program (see FIG. 12) and a virtual image generation processing program (see FIG. 14) to be discussed later, and so forth, and a flash memory 34 that stores a program read from the ROM 33 and a position setting table to be discussed later. In addition, the control circuit section 13 is connected to each of the projector 4, the lens drive motor 18, the screen front-rear drive motor 24, and the screen up-down drive motor 25 to control drive of the projector 4 and the various motors.

The CAN (controller area network) interface 14 is an interface that inputs and outputs data to and from a CAN which is an in-vehicle network standard installed in the vehicle to perform multiplex communication between various in-vehicle devices and control devices for vehicle devices. The HUD 1 is connected so as to be communicable with the various in-vehicle devices and the controls devices for vehicle devices (such as a navigation device 4 and an AV device 49, for example) via the CAN. Consequently, the HUD 1 can project an output screen of the navigation device 48, the AV device 49, etc.

Subsequently, a table generation processing program executed by the CPU 31 of the HUD 1 configured as described above will be described with reference to FIG. 12. FIG. 12 is a flowchart of the table generation processing program according to the embodiment. The table generation processing program is a program executed during initial setting of the HUD 1 to prepare a position setting table for use to move the second screen 21 and the second projection lens 17. The programs illustrated in the flowcharts of FIGS. 12 and 14 described below are stored in the RAM 32 or the ROM 33 of the HUD 1, and executed by the CPU 31.

In the table generation processing program, first, in step (hereinafter abbreviated as "S") 1, the CPU 31 sets a coefficient D(n) that indicates the generation distance L2, which is the distance from the passenger 7 to the second virtual image 8B, to an initial value of 2.5 [m].

Next, in S2, the CPU 31 calculates a new position of the second smell 21 for changing the generation distance L2 from the current value of D(n) to D(n)+0.1 [m] on the basis of a design value etc. of the HUD 1. Specifically, the amount of movement Ds(n) and the direction of movement of the second screen 21 are decided. It should be noted, however, that the direction of movement is the direction of moving away from the mirror 11 (the direction of moving closer to the light source) along the optical path of the light source.

Subsequently, in S3, the CPU 31 calculates a movement time Ts(n) required to move the second screen 21 in order to change the generation distance L2 from the current value of D(n) to D(n)+0.1 [m] on the basis of a design value etc. of the HUD 1. Specifically, in the case where the second screen 21 is moved, the movement time Ts(n) is calculated on the assumption that the second screen 21 is moved at the maximum movement speed of the second screen 21. That is, if the maximum movement speed of the second screen 21 is defined as Vs, the movement time Ts(n) is calculated using the following expression (1):

$$Ts(n)=Ds(n)/Vs \quad (1)$$

After that, in S4, the CPU 31 calculates a new position of the second projection lens 17 for causing the focal point of the visual image projected from the second projection lens 17 to coincide with the position of the second screen 21 after being moved in the case where the second screen 21 is moved by Ds(n) in the direction of moving away from the mirror 11 (the direction of moving closer to the light source) on the basis of a design value etc. of the HUD 1. Specifically, an amount of movement D1($n$) and the direction of movement of the second projection lens 17 are decided. It should be noted, however, that the direction of movement of the second projection lens 17 is opposite to that of the second screen 21, that is, the direction of moving closer to the mirror 11 (the direction of moving away from the light source), along the optical path of the light source.

Next, in S5, the CPU 31 calculates a movement speed V1($n$) for moving the second projection lens 17 on the basis of a design value etc. of the HUD 1. Specifically, the movement speed V1($n$) is calculated such that movement of the second screen 21 and movement of the second projection lens 17 are performed in conjunction with each other, that is, movement of the second screen 21 and movement of the second projection lens 17 are completed at the same time in the case where movement of the second projection lens 17 is started at the same time as movement of the second screen 21. Specifically, the movement speed V1($n$) is calculated using the following expression (2):

$$V1(n)=D1(n)/Ts(n) \quad (2)$$

After that, in S6, the CPU 31 stores Ds(n), Ts(n), D1($n$), and V1($n$) calculated in S2 to S5 in the memory in correspondence with the current value of D(n).

After that, in S7, n is incremented by one ("+1"). Further, the current value of D(n) is increased by 0.1 [m].

Next, in S8, the CPU 31 determines whether or not the current count value n is equal to or more than 184, that is, whether or not the processes in S2 to S7 have been executed every 0.1 m until the value of D(n), which has an initial value of 2.5 [m], becomes 20.0 [m] or more.

In the case where it is determined that the current count value n is equal to or more than 184 (S8: YES), the table generation processing program is ended. In the case where it is determined that the current count value n is not equal to or more than 184 (S8: NO), the processes in and after S2 are continuously performed for as new value of D(n) which has been increased by 0.1 [m].

As a result of executing the table generation processing program described above, a position setting table is prepared on the basis of the calculation results. As illustrated in FIG. 13, the position setting table stores, for each value of the generation distance L2, the amount of movement of the second screen 21, the movement time of the second screen 21, the amount of movement of the second projection lens 17, and the movement speed of the second projection lens for increasing or decreasing the generation distance L2 by 0.1 [m]. In the case where the generation distance L2 is increased by 0.1 [m], the direction of movement of the second screen 21 is the direction of moving away from the mirror 11 (the direction of moving closer to the light source), and the direction of movement of the second projection lens 17 is the opposite direction. In the case where the generation distance L2 is decreased by 0.1 [m], on the other hand, the direction of movement of the second screen 21 is the direction of moving closer to the mirror 11 (the direction of moving away from the light source), and the direction of movement of the second projection lens 17 is the opposite direction.

The prepared position setting table is stored in the flash memory 34 or the like, and used to move the second projection lens 17 and the second screen 21 in a virtual image generation processing program (FIG. 14) to be discussed later. In addition, the table generation processing program may be performed when the HUD 1 is first started, or may be performed in the factory in advance before shipment of the product.

Figure 14:
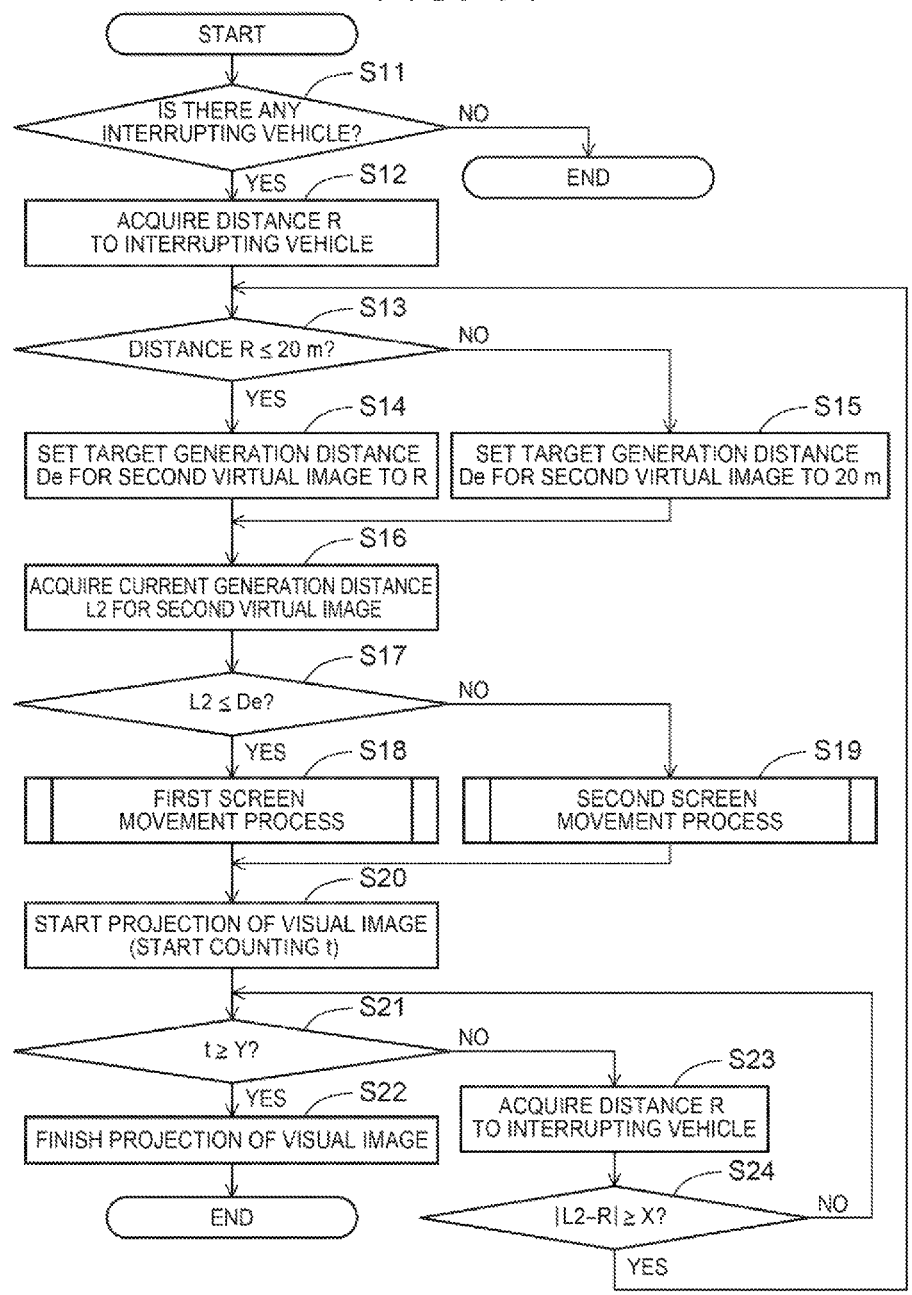
FIG. 14 is a flowchart of a virtual image generation processing program according to the embodiment.

Subsequently, a virtual image generation processing program executed by the CPU 31 of the HUD 1 will be described with reference to FIG. 14. FIG. 14 is a flowchart of the virtual image generation processing program according to the embodiment. The virtual image generation processing program is a program executed after ACC of the vehicle is turned on to generate a virtual image 8 for warning of another vehicle traveling in another lane in the case where the other vehicle interrupts ahead of the vehicle in the travel direction. In the following description, the mode of projection of an image to the screen 5 is the first projection mode (FIG. 10) at all times.

In the virtual image generation processing program, first, in S11, the CPU 31 determines whether or not another vehicle traveling in another lane has interrupted ahead of the vehicle in the travel direction. Specifically, the distance from a vehicle ahead is detected by a distance measurement sensor at all times, and it is determined that another vehicle has interrupted in the case where the distance is varied to become shorter by a predetermined amount or more at a time. Alternatively, information on turn signals of another vehicle traveling in a lane that is adjacent to the lane in which the vehicle is traveling may be acquired, and it may be determined that the other vehicle has interrupted in the case where one of the turn signals on the side of the lane in which the vehicle is traveling is operated.

In the case where it is determined that another vehicle traveling in another lane has interrupted ahead of the vehicle in the travel direction (S11: YES), the process proceeds to S12. In the case where it is determined that there is no interrupting vehicle (S111: NO), in contrast, the virtual image generation processing program is ended.

In S12, the CPU 31 acquires a distance R from the vehicle to the different vehicle which has interrupted (hereinafter referred to as an "interrupting vehicle") on the basis of the result of detection performed by the distance measurement sensor or the like. The distance R may be acquired using a captured image captured by a front camera instead of the distance measurement sensor.

In S13, the CPU 31 determines whether or not the distance R acquired in S12 is equal to or less than 20 m. The distance as the criterion for determination performed in S13 is decided in accordance with the specifications of the HUD 1. Specifically, the distance may be the longest generation distance 12 at which the HUD 1 can generate the second virtual image 8B. In the embodiment, as described above, the position (specifically, the generation distance L2 which is the distance from the passenger 7 to the second virtual image 8B) at which the second virtual image 8B which is a virtual image of the visual image projected to the second screen 21 is to be generated can be changed by moving the second screen 21 in the front-rear direction along the optical path (see FIG. 8). The generation distance L2 becomes the longest in the case where the second screen 21 is moved toward the projector 4 the most. In the case where the longest generation distance L2 at which the HUD 1 can generate the second virtual image 8B is 20 m, the criterion for determination performed in S13 is 20 m. In the case where the longest generation distance 12 at which the HUD 1 can generate the second virtual image 8B is 30 m, meanwhile, the criterion for determination performed in S13 is 30 m. In the following example, the longest generation distance L2 at which the HUD 1 can generate the second virtual image 8B is assumed to be 20 m.

In the case where it is determined that the distance R acquired in S12 is equal to or less than 20 in (S13: YES), the process proceeds to S14. In the case where it is determined that the distance R acquired in S12 is not equal to or less than 20 m (S13: NO), the process proceeds to S15.

In S14, the CPU 31 sets a target generation distance De, which serves as the target value for the generation distance L2 for the second virtual image 8B, to the distance R acquired in S12. In S15, on the other hand, the CPU 31 sets the target generation distance De, which serves as the target value for the generation distance L2 for the second virtual image 8B, to 20 m which is the largest distance. After that, the CPU 31 controls the position of the second screen 21 such that the second virtual image 8B is generated at a position the target generation distance De set in S14 or S15 away from the passenger 7 as discussed later.

Subsequently, in S16, the CPU 31 acquires the current generation distance L2 for the second virtual image 8B.

Next, in S17, the CPU 31 determines whether or not the current generation distance L2 for the second virtual image 8B acquired in S6 is equal to or less than the target generation, distance De set in S14 or S15, that is, whether or not the position at which the second virtual image 8B is currently generated is closer to the passenger than the targeted position is.

In the case where it is determined that the current generation distance L2 for the second virtual image 8B is equal to or less than the target generation distance De set in S14 or S15 (S17: YES), the process proceeds to S18. In the case where it is determined that the current generation distance L2 for the second virtual image 8B is not equal to or less than the target generation distance De set in S14 or S15 (S17: NO), in contrast, the process proceeds to S19.

In S18, the CPU 31 executes a first screen movement process (FIG. 16) to be discussed later. In the first screen movement process, control for moving the second screen 21 and the second projection lens 17 in position is performed such that the second virtual image 8B is generated at a position the target generation distance De set in S14 or S15 away from the passenger 7 on the basis of the position setting table (FIG. 13) prepared in the table generation processing program (FIG. 12).

In S19, similarly, the CPU 31 executes a second semen movement process (FIG. 17) to be discussed later, in the second screen movement process, control for moving the second screen 21 and the second projection lens 17 in position is performed such that the second virtual image 8B is generated at a position the target generation distance De set in S14 or S15 away from the passenger 7 on the basis of the position setting table (FIG. 13) prepared in the table generation processing program (FIG. 12).

Next, in S20, the CPU 31 transmits a signal to the projector 4 to cause the projector 4 to start projecting a visual image. Examples of the visual image projected by the projector 4 include information on the vehicle 2 and various kinds of information used to assist the passenger 7 in driving. Examples of such information include a warning of an obstacle (another vehicle or a pedestrian), a route for guidance set by a navigation device and guidance information (such as an arrow that indicates the direction of a right or left turn) based on the route for guidance, the current vehicle speed, a guide sign, a map image, traffic information, news, a weather forecast, the time, the screen of a connected smartphone, and a television program.

In the embodiment, in particular, the visual image projected to the first screen 20 by the first projection lens 16 is a visual image for the current vehicle speed of the vehicle. Meanwhile, the visual, image projected to the second screen 21 by the second projection lens 17 is a visual image for warning of an interrupting vehicle. In the embodiment, as illustrated in FIG. 2, the second screen 21 is disposed below the first screen 20. Thus, as a result of being reflected by the mirror 11, the second virtual image 8B which is a virtual image of the visual image projected to the second screen 21 is generated above the first virtual image 8A which is a virtual image of the visual image projected to the first screen 20.

Thus, as illustrated in FIG. 15, a numerical value that indicates the current vehicle speed is generated as the first virtual, image 8A near the lower edge of the windshield 6 and ahead of the windshield 6 to be visually recognizable from the passenger. In addition, a frame that surrounds an interrupting vehicle 61 is generated as the second virtual image 8B near the center of the windshield 6 and ahead of the windshield 6 to be visually recognizable from the passenger. Because the first screen 20 is stationary in position, the position at which the first virtual image 8A is generated (specifically, the generation distance L1 which is the distance from the passenger 7 to the first virtual image 8A) is also stationary at a position 2.5 m ahead of the passenger 7. The generation distance L1 may be other than 2.5 m. It should be noted, however, that the generation distance L1 is preferably about 2 m to 4 m, because the first virtual image 8A is embedded in the road surface if the generation distance L1 is excessively long.

In the example illustrated in FIG. 15, a visual image for the current vehicle speed is displayed as the first virtual image 8A. However, other information, the distance to which from the vehicle need not be changed, such as a guide sign, a map image, traffic information, news, a weather forecast, the time, the screen of a connected smartphone, and a television program, for example, may also be displayed. By setting the generation distance L1 to an appropriate constant distance (e.g. 2.5 m), generation of an unnatural virtual image such as one embedded in the road surface can be prevented even in the case where the position at which the second virtual image 8B is generated is changed with the interrupting vehicle 61 approaching the vehicle as illustrated in FIG. 15. Further, it is possible to reduce movement of the line of vision as much as possible when the passenger of the vehicle visually recognizes the first virtual image 8A, and to reduce a burden during drive.

On the other hand, as illustrated in FIG. 15, the position at which the second virtual image 8B is generated is the position the target generation distance De set in S14 or S15 ahead of the passenger of the vehicle (that is, the position of the interrupting vehicle 61). Thus, it is possible to reduce movement of the line of vision as much as possible when the passenger visually recognizes the second virtual, image 8B, and to reduce a burden during drive.

After that, in S21, the CPU 31 determines whether or not an elapsed time t since projection of a visual image by the projector 4 is started in S20 has become equal to or more than a predetermined time Y (e.g. five seconds or more). The predetermined time Y can be changed as appropriate also in accordance with the content of the visual image to be projected.

In the case where it is determined that the elapsed time t since projection of a visual image by the projector 4 is started has become equal to or more than the predetermined time Y (S21: YES), projection of the visual image by the projector 4 is finished (S22). Only projection by the second projection lens 17 may be finished, and projection by the first projection lens 16 may be continued.

In the case where it is determined that the elapsed time t since projection of a visual image by the projector 4 is started has not become equal to or more than the predetermined time Y (S21: NO), on the other hand, the process proceeds to S23.

In S23, the CPU 31 acquires the distance R from the vehicle to the interrupting vehicle again.

Next, in S24, the CPU 31 determines whether or not the difference between the target generation distance De set in S14 or S15 and the distance R acquired in S21 is equal to or more than a predetermined distance X (e.g. 2 m). The predetermined distance X can be changed as appropriate also in accordance with the content of the visual image to be projected.

In the case where it is determined that the difference between the target generation distance De set in S14 or S15 and the distance R acquired in S23 is equal to or more than the predetermined distance X (S24: YES), the process proceeds to S13. After that, the target generation distance De is newly set on the basis of the newly acquired distance R (S14 and S15) to move the second screen 21. As a result, the second virtual image 8B can be generated at the position of the interrupting vehicle after being changed even in the case where the distance from the vehicle to the interrupting vehicle is varied significantly.

In the case where it is determined that the difference between the target generation distance De set in S14 or S15 and the distance R acquired in S23 is not equal to or more than the predetermined distance X (S24: NO), the process proceeds to S21 to continue projection of the current visual image.

Figure 16:
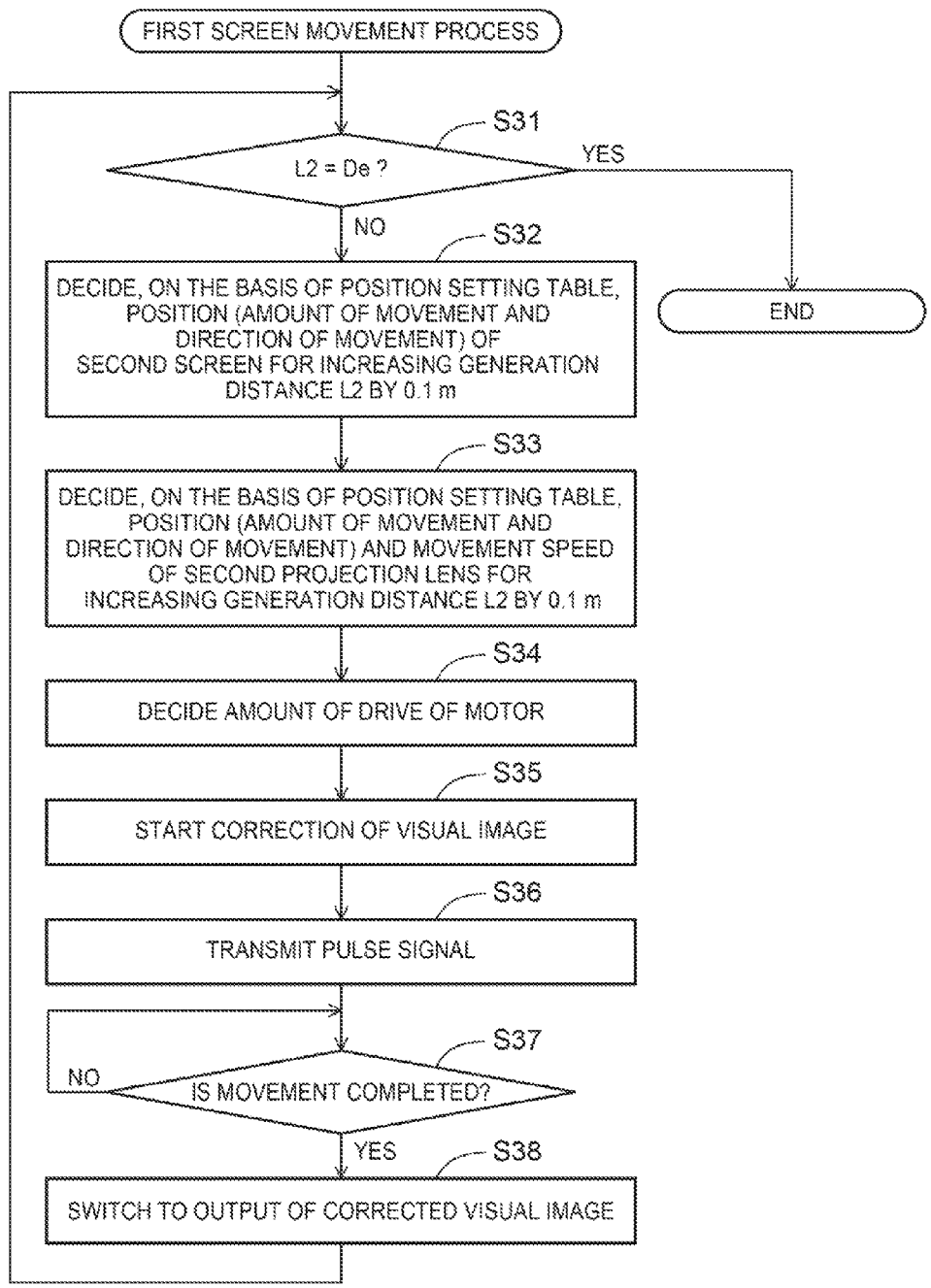
FIG. 16 is a flowchart of a sub-processing program of a first screen movement process.

Next, a sub-processing of the first screen movement process executed in S18 will be described with reference to FIG. 16. FIG. 16 is a flowchart of a sub-processing program of the first screen movement process.

First, in S31, the CPU 31 determines whether or not the current generation distance L2 for the second virtual image 8B is equal to the target generation distance De set in S14 or S15.

In the case where it is determined that the current generation distance L2 for the second virtual image 8B is equal to the target generation distance De set in S14 or S15 (S31: YES), control for moving the second screen 21 and the second projection lens 17 is ended, and the process proceeds to S20. In the case where it is determined that the current generation distance L2 for the second virtual image 8B is not equal to the target generation distance De set in S14 or S15 (S31: NO), the process proceeds to S32.

In S32, the CPU 31 decides, on the basis of the position setting table (FIG. 13), a new position (specifically, the amount of movement and the direction of movement) of the second screen 21 for increasing the current generation distance L2 by 0.1 m (that is, changing the position at which the second virtual image 8B is generated to a position 0.1 m farther from the passenger than the current position). It should be noted, however, that the direction of movement is the direction of moving away from the mirror 11 (the direction of moving closer to the light source) along the optical path of the light source. In addition, the movement speed of the second screen 21 is the maximum movement speed of the second screen 21.

Next, in S33, the CPU 31 decides, on the basis of the position setting table (FIG. 13), a new position (specifically, the amount of movement and the direction of movement) and the movement speed of the second projection lens 17 for increasing the current generation distance L2 by 0.1 m (that is, changing the position at which the second virtual image 8B is generated to a position 0.1 m farther from the passenger than the current position). It should be noted, however, that the direction of movement is the direction of moving closer to the mirror 11 (the direction of moving away from the light source) along the optical path of the light source.

Next, in S34, the CPU 31 decides the amount of drive (number of pulses) required for the screen front-rear drive motor 24 to move the second screen 21 by the amount of movement decided in S32. Similarly, the CPU 31 decides the amount of drive (number of pulses) required for the lens drive motor 18 to move the second projection lens 17 by the amount of movement decided in S33.

Subsequently, in S35, the CPU 31 transmits a signal to the projector 4 to start correcting a visual image output from the projector 4. Specifically, the CPU 31 performs a process for adjusting distortion and the size of the visual image projected from the second projection lens 17 to the second screen 21 etc. along with a change in position of the second screen 21. Consequently, an appropriate virtual image with no distortion etc. can be generated even during movement of the screen.

Next, in S36, the CPU 31 transmits a pulse signal for driving the screen front-rear drive motor 24 by the amount of drive decided in S34 to the screen front-rear drive motor 24. Similarly, the CPU 31 transmits a pulse signal for driving the lens drive motor 18 by the amount of drive decided in S34 to the lens drive motor 18. In addition, the CPU 31 also transmits a signal instructing the movement speed at which the second projection lens 17 is to be moved to the lens drive motor 18. When the pulse signal is received, the screen front-rear drive motor 24 and the lens drive motor 18 perform drive on the basis of the received pulse signal. As a result, the second screen 21 is moved in the direction of movement decided in S32 by the amount of movement also decided in S32, and the second projection lens 17 is moved in the direction of movement decided in S33 by the amount of movement and at the movement speed also decided in S33.

Subsequently, in S37, the CPU 31 determines whether or not movement of the second screen 21 and the second projection lens 17 has been completed. Specifically, it is determined that movement of the second screen 21 and the second projection lens 17 has been completed in the case where a signal indicating completion of drive is received from the screen front-rear drive motor 24 and the lens drive motor 18 to which a pulse signal is transmitted in S36.

In the case where it is determined that movement of the second screen 21 and the second projection lens 17 has been completed (S37: YES), the process proceeds to S38. In the case where it is determined that movement of the second screen 21 and the second projection lens 17 has not been completed (S37: NO), in contrast, the process stands by until such movement is completed.

In S38, the CPU 31 transmits a signal to the projector 4 to cause the projector 4 to start projecting a visual image corrected in correspondence with the position of the second screen 21 after being moved. Specifically, the CPU 31 outputs a visual image with distortion and the size corrected in accordance with the position of the second screen 21 after being moved. After that, the process proceeds to S31, and the CPU 31 determines whether or not the generation distance L2 for the second virtual image 8B after the second screen 21 is moved has reached the target generation distance De set in S14 or S15.

Figure 17:
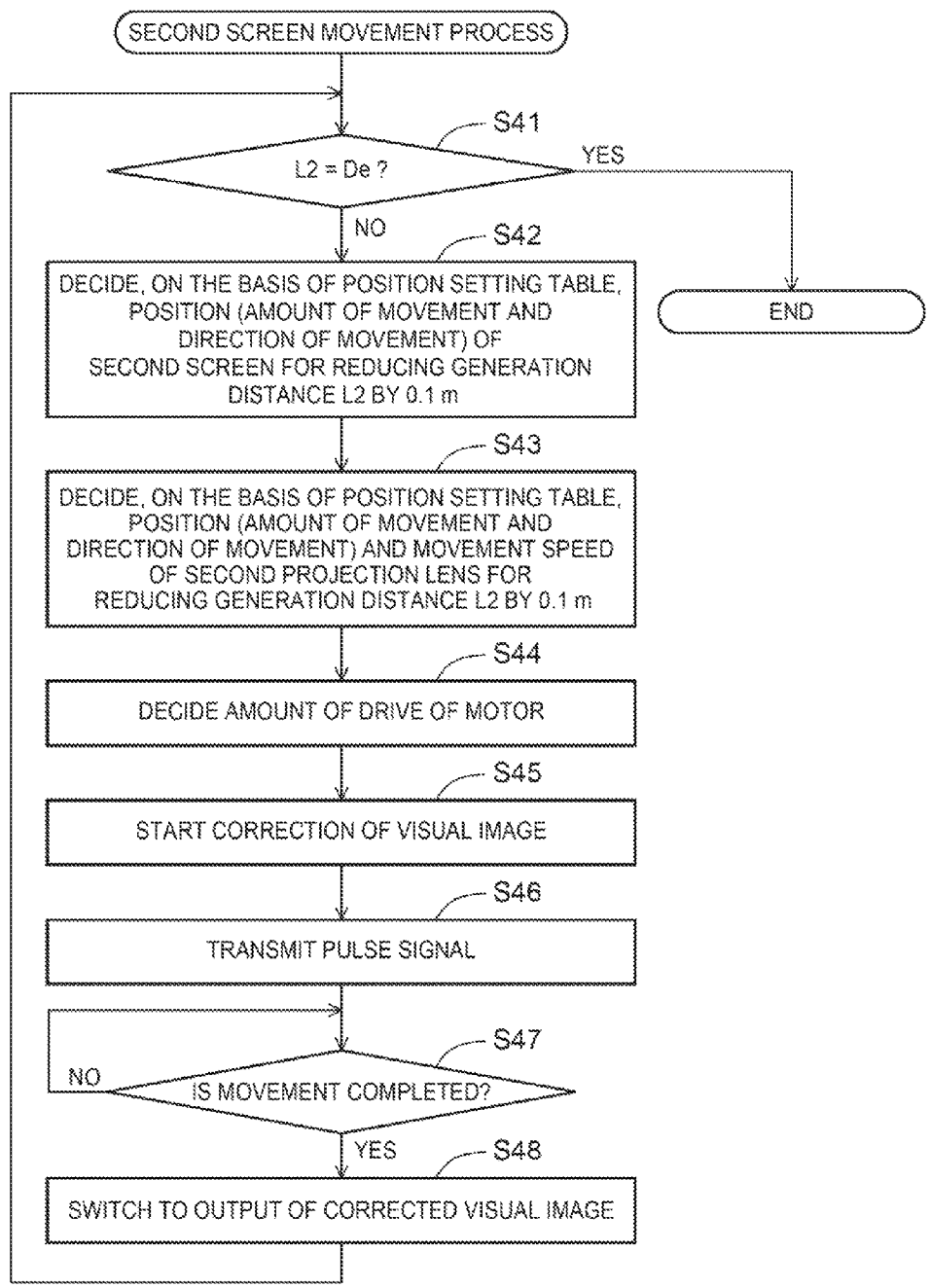
FIG. 17 is a flowchart of a sub-processing program of a second screen movement process.

Next, a sub-processing of the second screen movement process executed in S19 will be described with reference to FIG. 17. FIG. 17 is a flowchart of a sub-processing program of the second screen movement process.

First, in S41, the CPU 31 determines whether or not the current generation distance L2 for the second virtual image 8B is equal to the target generation distance De set in S14 or S15.

In the case where it is determined that the current generation distance L2 for the second virtual image 8B is equal to the target generation distance De set in S14 or S15 (S41: YES), control for moving the second screen 21 and the second projection lens 17 is ended, and the process proceeds to S20. In the case where it is determined that the current generation distance L2 for the second virtual image 8B is not equal to the target generation distance De set in S14 or S15 (S41: NO), the process proceeds to S42.

In S42, the CPU 31 decides, on the basis of the position setting table (FIG. 13), a new position (specifically, the amount of movement and the direction of movement) of the second screen 21 for decreasing the current generation distance L2 by 0.1 m (that is, changing the position at which the second virtual image 8B is generated to a position 0.1 m closer to the passenger than the current position). It should be noted, however, that the direction of movement is the direction of moving closer to the mirror 11 (the direction of moving away from the light source) along the optical path of the light source. In addition, the movement speed of the second screen 21 is the maximum movement speed of the second screen 21.

Next, in S43, the CPU 31 decides, on the basis of the position setting table (FIG. 13), a new position (specifically, the amount of movement and the direction of movement) and the movement speed of the second projection lens 17 for decreasing the current generation distance L2 by 0.1 m (that is, changing, the position at which the second virtual image 8B is generated to a position 0.1 m closer to the passenger than the current position). It should be noted, however, that the direction of movement is the direction of moving away from the mirror 11 (the direction of moving closer to the light source) along the optical path of the light source.

Next, in S44, the CPU 31 decides the amount of drive (number of pulses) required for the screen front-rear drive motor 24 to move the second screen 21 by the amount of movement decided in S42. Similarly, the CPU 31 decides the amount of drive (number of pulses) required for the lens drive motor 18 to move the second projection lens 17 by the amount of movement decided in S43. The subsequent processes in S44 to S48 are the same as the processes in S34 to 38 of the first screen movement process (FIG. 16) described already, and thus will not be described.

As illustrated in FIG. 18, the second screen 21 and the second projection lens 17 are configured to be movable in position along an optical path 52 of a light source 51 of the projector 4. The generation distance L2 depends on the distance from the mirror 11 to the second screen 21. Thus, in the first screen movement process (FIG. 16) and the second screen movement process (FIG. 17) discussed above, the second screen 21 is moved in position such that the distance from the mirror 11 to the second screen 21 corresponds to the target generation distance De set in S14 or S15.

On the other hand, the position of the second projection lens 17 is decided such that the focal point of the visual image projected from the second projection lens 17 is adjusted onto the second screen 21. That is, if the second screen 21 is moved in the direction of moving away from the mirror 11 (that is, the direction of moving closer to the second projection lens 17) along the optical path in order to increase the generation distance L2, the second projection lens 17 is moved in the direction of moving closer to the second screen 21, which is the opposite direction, along the optical path. If the second screen 21 is moved in the direction of moving closer to the mirror 11 (that is, the direction of moving away from the second projection lens 17) along the optical path in order to reduce the generation distance L2, on the other hand, the second projection lens 17 is moved in the direction of moving away from the second screen 21, which is the opposite direction, along the optical path. As described above, in addition, with the amount of movement that changes the generation distance L2 by 0.1 m defined as a first unit amount, the second screen 21 is repeatedly moved until the generation distance L2 becomes equal to the target generation distance De set in S14 or S15 (S32 to S37 and S42 to S47). Further, each time the second screen 21 is moved by the first unit amount, the second projection lens 17 is moved by a second unit amount such that the focal point of the visual image is adjusted on the second screen 21 after being moved. In addition, the time during which the second screen 21 is moved by the first unit amount and the time during which the second projection lens 17 is moved by the second unit amount are also equal to each other with the respective timings to start movement also linked to each other.

As a result, even in the case where the second screen 21 is moved toward the second projection lens 17 in order to increase the generation distance L2, and even in the case where the second screen 21 is moved toward the mirror 11 in order to reduce the generation distance L2, it is possible to maintain a state in which the focal point of the visual image projected from the second projection lens 17 is adjusted onto the second screen 21 at all times. Consequently, a clear visual image can be projected also during and after movement of the second screen 21.

In addition, if the second screen 21 is moved toward the second projection lens 17 in order to increase the generation distance L2, the lightness of the visual image projected onto the second screen 21 is increased because of a fact that the distance from the second projection lens 17 and the light source 51 to the second screen 21 is reduced. If the second screen 21 is moved away from the second projection lens 17 in order to reduce the generation distance L2, conversely, the lightness of the visual image projected onto the second screen 21 is reduced because of a fact that the distance from the second projection lens 17 and the light source 51 to the second screen 21 is increased. As a result, even in the case where the distance from the passenger of the vehicle to the second virtual image 8B is increased, the second virtual image 8B can be made lighter, which makes it possible to improve the viewability of the second virtual image 8B. In the case where the distance from the passenger of the vehicle to the second virtual image 8B is reduced, on the other hand, the second virtual image 8B can be made less light, which makes it possible to prevent the field of view of the passenger from being obstructed by the second virtual image 8B.

In addition, if the second screen 21 is moved toward the second projection lens 17 in order to increase the generation distance L2, the visual image displayed on the second screen 21 is reduced in size, even in the case where the same visual image is projected from the projector 4, because of a fact that the distance from the second projection lens 17 to the second screen 21 is reduced. As a result, if the distance from the passenger of the vehicle to the second virtual image 8B is increased, the second virtual image 8B can also be accordingly reduced in size, even without changing the visual image projected from the projector 4 in size. Thus, it is possible to generate the second virtual image 8B with an appropriate size that matches the distance from the passenger to the second virtual image 8B.

With the HUD 1 according to the embodiment, as has been described in detail above, a virtual image of a visual image to be visually recognized by the passenger 7 of the vehicle is generated by projecting respective visual images from the projector 4 which uses an LED light source to the first screen 20 and the second screen 21 via the first projection lens 16 and the second projection lens 17, and reflecting the visual images projected to the first screen 20 and the second screen 21 to the windshield 6 of the vehicle 2 to be visually recognized by the passenger 7 of the vehicle. The second projection lens 17 and the second screen 21 are independently movable along the optical path, the generation distance L2 from the passenger to the virtual image is adjusted by moving the second screen 21, and the second projection lens 17 is moved along with movement of the second screen 21 such that the focal point of the visual image projected from the second projection lens 17 is adjusted on the second screen 21. Thus, the generation distance L2 from the passenger 7 to the second virtual image 8B can be adjusted by moving the second screen 21, and the focal point of the visual image projected from the second projection lens 17 can be adjusted on the second screen 21 even in the case where the second screen 21 is moved. Thus, a high-quality visual image can be generated as the virtual image. In addition, the position at which the second virtual image 8B is generated is decided, and thereafter the position of the second screen 21 is decided on the basis of the decided position of the second virtual image 8B. Thus, in the case where a visual image for an object such as an obstacle and an intersection, the distance to which from the passenger of the vehicle is variable, is displayed as a virtual image, the second virtual image 8B can be generated at an appropriate position that matches the distance from the user to the object. Further, the position of the second projection lens 17 is decided on the basis of the decided position of the second screen 21. Thus, the focal point of the visual image projected from the second projection lens 17 can be adjusted on the second screen 21 while generating a virtual image at an appropriate position that matches the distance from the passenger of the vehicle to the object.

It should be understood that various improvements and modifications may be made without departing from the scope and spirit of the inventive principles.

For example, in the embodiment, a virtual image is generated ahead of the windshield 6 of the vehicle 2 by the HUD 1. However, a virtual image may be generated ahead of a window other than the windshield 6. The visual image may not be reflected to the windshield 6 itself by the HUD 1, and may be reflected to a visor (combiner) installed around the windshield 6.

In the embodiment, the HUD 1 is installed in the vehicle 2. However, the HUD 1 may be installed in a mobile body other than the vehicle 2. For example, the HUD 1 may be installed in a ship, an airplane, or the like. Alternatively, the HUD 1 may be installed in a ride-type attraction installed in an amusement facility. In this case, a virtual image can be generated around a ride to be visually recognized by a passenger of the ride.

In the embodiment, a visual image for information, the generation distance of which need not be changed, such as the current vehicle speed, a guide sign, a map image, traffic information, news, a weather forecast, the time, the screen of a connected smartphone, and a television program is displayed as the first virtual image 8A. As with the second virtual image 8B, however, the first virtual image 8A may also be a visual image for an object such as an obstacle and an intersection, the distance to which from the vehicle is variable (that is, information, the generation distance of which needs to be changed).

In the embodiment, only the second screen 21 is configured to be movable in the front-rear direction along the optical path. However, the first screen 20 may also be configured to be movable. Similarly, the first projection lens 16 may also be configured to be movable. In this case, the generation distance L1 of the first virtual image 8A can be changed.

In the embodiment, the screen is composed of two screens, namely the first screen 20 and the second screen 21, and the lens of the projector 4 is composed of two lenses, namely the first projection lens 16 and the second projection lens 17. However, the number of screens and lenses may be one pair only or three pairs or more. Besides an LED, in addition, a lamp or a laser may also be used as the light source of the projector 4.

While a head-up display device according to a specific embodiment has been described above, the head-up display device may also be configured as described below, and the following effect can be achieved in such cases.

For example, a first configuration is as follows.

The head-up display device is characterized by including screen movement decision means for deciding, on the basis of the screen position decided by the screen position decision means, a direction of movement and an amount of movement for moving the screen to the screen position, and lens movement decision means for deciding, on the basis of the lens position decided by the lens position decision means, a direction of movement and an amount of movement for moving the lens to the lens position; the screen movement means moves the screen in accordance with the direction of movement and the amount of movement decided by the screen movement decision means; and the lens movement means moves the lens in accordance with the direction of movement and the amount of movement decided by the lens movement decision means.

With the head-up display device configured as described above, the position at which the virtual image is generated is decided, and thereafter the direction of movement and the amount of movement of the screen are decided on the basis of the decided position of the virtual image. Thus, in the case where a visual image for an object such as an obstacle and an intersection, the distance to which from the user is variable, is displayed as a virtual image, the virtual image can be generated at an appropriate position that matches the distance from the user to the object. Further, the direction of movement and amount of movement of the projection lens are decided on the basis of the decided direction of movement and amount of movement of the screen. Thus, the focal point of the visual image projected from the projection lens can be adjusted on the screen while generating a virtual image at an appropriate position that matches the distance from the user to the object.

A second configuration is as follows.

The head-up display device is characterized in that the lens movement decision means decides the position of the projection lens so as to adjust a focal point of the visual image projected from the projection lens on the screen.

With the head-up display device configured as described above, the distance from the user to the virtual image can be adjusted by moving the screen, and the focal point of the visual image projected from the projection lens can be adjusted on the screen even in the case where the screen is moved. Thus, a high-quality visual image can be generated as the virtual image.

A third configuration is as follows.

The head-up display device is characterized in that the lens movement decision means decides the direction of movement such that the projection lens and the screen are moved in directions different from each other along the optical path.

With the head-up display device configured as described above, the focal point of the visual image projected from the projection has is adjusted on the screen by moving the projection lens and the screen in directions different from each other along the optical path. Thus, the focal point of the visual image projected from the projection lens can be adjusted on the screen even if movement of the projection lens and the screen is minimum and no matter in which direction the screen is moved along the optical path. In addition, it is not necessary to provide a clearance for the distance from the light source to the projection lens, which enables a reduction in size of the device.

A fourth configuration is as follows.

The head-up display device is characterized in that the screen movement means repeatedly performs first operation, in which the screen is moved by a predetermined first unit amount in the direction of movement decided by the screen movement decision means, until the screen is moved by the amount of movement decided by the screen movement decision means; the lens movement means repeatedly performs second operation, in which the projection lens is moved by a predetermined second unit amount in the direction of movement decided by the lens movement decision means, until the projection lens is moved by the amount of movement decided by the lens movement decision means; and each time the first operation is performed for the screen, the second operation is performed for the projection lens such that a focal point of the visual image projected from the projection lens is adjusted on the screen after being moved by the first unit amount.

With the head-up display device configured as described above, even in the case where the screen is moved toward or away from the projection lens in order to change the position at which the virtual image is to be generated, it is possible to maintain a state in which the focal point of the visual image projected from the projection lens is adjusted onto the screen at all times. Consequently, a clear visual image can be projected also during and after movement of the screen.

A fifth configuration is as follows.

The head-up display device is characterized in that the first operation and the second operation are started at the same timing; and a speed of movement of the projection lens by the lens movement means is defined as a value obtained by dividing the second unit amount by a time required for the screen to be moved by the first unit amount.

With the head-up display device configured as described above, movement of the screen and movement of the projection lens can be linked to each other. Thus, it is possible to maintain a state in which the focal point of the visual image projected from the projection lens is adjusted onto the screen at all times before, during, and after movement of the screen by the first unit amount.

A sixth configuration is as follows.

The head-up display device is characterized in that the projector continuously projects the visual image to the screen while correcting the visual image in accordance with variations in position of the screen during a period for which the screen is moved by the screen movement means.

With the head-up display device configured as described above, an appropriate virtual image with no distortion etc. can be generated even during movement of the screen.

The invention claimed is:

1. A head-up display device characterized by comprising:
   a screen;
   a projector that projects a visual image to the screen using a projection lens;
   a processor programmed to:
      generate a virtual image of the visual image from the projected visual image;
      determine an image-generation position at which the virtual image is to be generated, the screen and the projection lens being configured to be movable along an optical path of the projector;
      determine a screen position to which the screen is to be moved on the basis of the decided image-generation position;
      determine, on the basis of the determined screen position, a direction of screen movement and an amount of screen movement for moving the screen to the determined screen position;
      determine a lens position to which the projection lens is to be moved on the basis of the determined screen position; and
      determine, on the basis of the determined lens position, a direction of lens movement and an amount of lens movement for moving the lens to the determined lens position;
   a screen-drive motor that moves the screen to the determined screen position by repeatedly performing a first operation, in which the screen is moved by a predetermined first unit amount in the determined direction of screen movement, until the screen is moved by the determined amount of screen movement; and
   a lens-drive motor that moves the projection lens to the determined lens position by repeatedly performing a second operation, in which the projection lens is moved by a predetermined second unit amount in the determined direction of lens movement, until the projection lens is moved by the determined amount of lens movement;
   wherein, each time the first operation is performed for the screen, the second operation is performed for the projection lens such that a focal point of the visual image projected from the projection lens is adjusted on the screen after being moved by the first unit amount.

2. The head-up display device according to claim 1, wherein:
   the processor is programmed to determine the position of the projection lens so as to adjust the focal point of the visual image projected from the projection lens on the screen.

3. The head-up display device according to claim 1, wherein:
   the processor is programmed to determine the direction of lens movement such that the projection lens and the screen are moved in directions different from each other along the optical path.

4. The head-up display device according to claim 1, wherein:
   the first operation and the second operation are started at the same timing; and
   a speed of movement of the projection lens by the lens-drive motor is defined as a value obtained by dividing the second unit amount by a time required for the screen to be moved by the first unit amount.

5. The head-up display device according to claim 1, wherein:
   the projector continuously projects the visual image to the screen while correcting the visual image in accordance with variations in position of the screen during a period for which the screen is moved by the screen-drive motor.

* * * * *